United States Patent

[11] 3,582,215

[72] Inventor Jean Eugene Martial Cornillault,
Antony, France
[21] Appl. No. 798,997
[22] Filed Feb. 13, 1969
[45] Patented June 1, 1971
[73] Assignee International Standard Electric
Corporation, New York, N.Y.
[32] Priority Feb. 16, 1968
[33] France
[31] 140,070

[54] APPARATUS FOR ALIGNING TWO OR MORE OPTICAL AXES
6 Claims, 12 Drawing Figs.

[52] U.S. Cl. .......................................... 356/152,
138, 139; 350/286
[51] Int. Cl. .......................................... G01b 11/26(Y)
[50] Field of Search .......................................... 350/145,
286, 287; 356/3, 4, 6, 138, 139, 152, 153

[56] References Cited
UNITED STATES PATENTS
3,424,516 1/1969 Snyder III .............. 350/286
3,518,005 6/1970 Weber .................. 356/153

Primary Examiner—Rodney D. Bennett, Jr.
Assistant Examiner—S. C. Buczinski
Attorney—C. Cornell Remsen, Jr., Walter J. Baum, Percy P. Lantzy, Philip M. Bolton, Isidore Togut, and Charles L. Johnson ABSTRACT: Apparatus for aligning a three axis laser telemetry system having transmission, reception, and aiming axes. A laser pulse is transmitted through attenuators to a two-reflection pentagonal prism, the pulse emitted from said prism being rotated by 90°. Said pulse is transmitted to a second pentagonal prism, said second prism being a three-reflection prism, and the pulse is emitted from said three-reflection prism again rotated by 90°. The pulse emitted by said second prism is transmitted via semi-transparent mirros and a movable trihedral light reflector to an electroluminescent screen to illuminate a spot thereon. Movable cross-wires are aligned with this spot. The reception axis is aligned with an input face of said second prism and a marking point of said reception axis is viewed through semi-transparent mirrors and moved until it is aligned with said cross-wires, thereby providing that the reception axis and the transmission axis are now parallel. A marking point of said aiming axis is then viewed and said axis is adjusted until it coincides with said corss-wires thereby providing that all three axes are aligned.

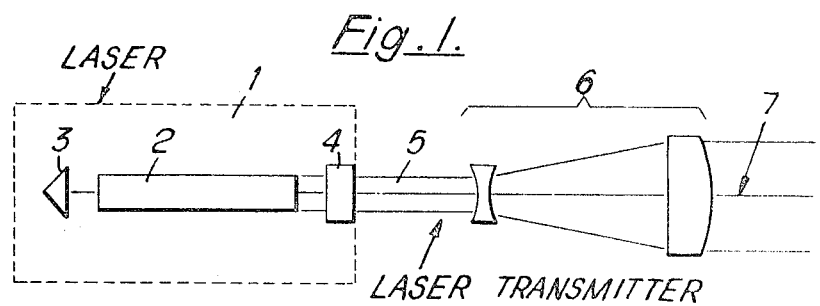
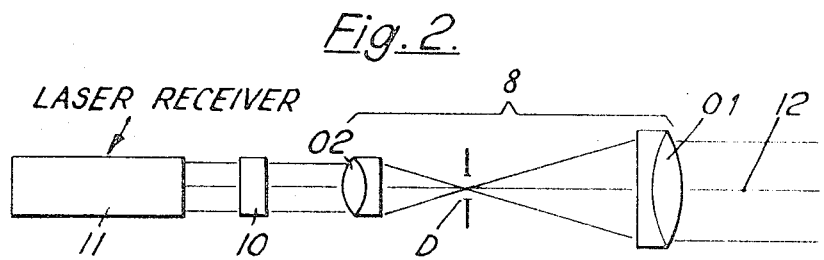
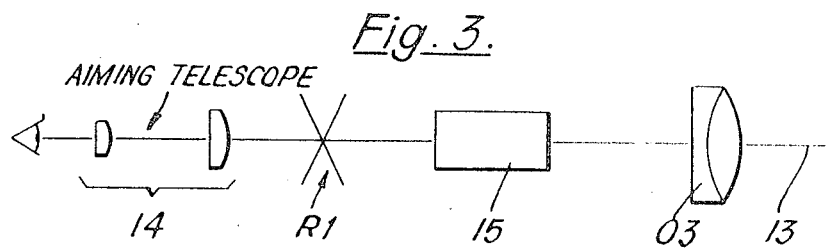

Inventor
JEAN E. M. CORNILLAULT

APPARATUS FOR ALIGNING TWO OR MORE OPTICAL AXES

BACKGROUND OF THE INVENTION

The present invention concerns apparatus for aligning optical axes and more particularly for adjusting the parallelism of several optical axes, such as the optical axes of a laser telemeter.

Adjustment of the parallelism of two optical axes depends upon the spacing of the said optical axes. When this spacing is small, the two optical systems of which it is required to adjust the parallelism of the axes are located in front of the objective of an autocollimator telescope, and the orientation of one of the optical systems is adjusted in order that the image of its cross-wires seen through the telescope should superpose with the image of the cross-wires of the other optical system. When the spacing of the two optical axes is large, and exceeds the dimensions of the objective, the adjustment is obtained by replacing the autocollimator telescope by two telescopes, the spacing of which corresponds to the spacing of the optical axes to be adjusted and the parallelism of which is obtained mechanically to the required accuracy. This second way of adjustment is set into operation for instance for the adjustment of binoculars.

When the optical axes are those of emission, reception and aiming devices of a laser telemeter, the said optical axes are often far away from each other, and the use of an autocollimator telescope is not possible. The second way of adjustment, set into operation for the adjustment of binoculars, cannot be used since its accuracy is not sufficient. Besides, for these two ways of adjustment, it is not possible to observe the laser light pulse owing to the danger it represents. The usual way of adjustment is then the following: a target, constituted for instance by a paper sheet on which three crosses reproduce the relative position of the three optical axes is located at a certain range from the telemeter. The telemeter is then oriented in such a way as the laser beam is centered on the cross corresponding to the emission optical axis. The cross-wires of the aiming telescope is then moved to make it coincide with the corresponding cross of the target. For the adjustment of the reception axis, the photomultiplier arranged at the output of the reception optical system is removed and replaced by a collimator, in order to observe the corresponding cross of the target. The adjustment of the alignment of this axis is obtained by moving the diaphragm of the reception optical system.

In such a method of adjustment, owing to the short duration of the light pulse, it is difficult to coincide the laser impact with the center of the target cross. Besides, the adjustment of the reception axis requires the taking down of the photomultiplier.

SUMMARY OF THE INVENTION

The object of the present invention is therefore to achieve apparatus for adjusting the parallelism of optical axes, the spacing of which is big, the accuracy of adjustment depending only upon the manufacturing accuracy of some of the optical elements.

Another object of the present invention is to achieve apparatus for the adjustment of the parallelism of optical axes, the setting into operation of which is simple and fast.

According to a feature of the present invention, an apparatus for adjusting the parallelism of two optical axes corresponding to two separate optical systems comprises mainly two pentagonal prisms carrying out a rotation by 90° of the incident beam, one being reducible to two reflections, whereas the other is reducible to three reflections; these two pentagonal prisms are arranged in such a way as an incident ray is deviated successively by the two pentagonal prisms and produces an output ray parallel to the incident ray; and means enabling the movement of one of the two pentagonal prisms according to an axis perpendicular to the opposite faces of the pentagonal prisms.

According to another feature of the present invention, an optical system associated with the two pentagonal prisms enables the observation in one plane of the cross-wires or diaphragms defining the optical axes to be aligned.

According to another feature of the present invention, when one of the two optical axes is the emission axis of a laser telemeter, provision is made on one hand for means for attenuating the laser pulse energy and on the other hand for means for keeping in memory the position of the beam impact.

According to another feature of the present invention, the optical observation system comprises a concealable angular light reflector (a movable trihedral light reflector) located in front of the fixed pentagonal prism, a first semi-transparent mirror located between the angular light reflector and said pentagonal prism, and deviating the light beam coming from the direction of the angular light reflector towards an observation telescope, an electroluminescent screen receiving the output light beam of the observation telescope, cross-wires moving in its plane, a second semi-transparent mirror located on the path of the output beam of the observation telescope and enabling the simultaneous observation of the electroluminescent screen and the moving cross-wires, a projector associated with a third semi-transparent mirror located between the fixed pentagonal prism and the first semi-transparent mirror enabling the lighting, when the anuglar light reflector is concealed, of the cross-wires or the diaphragm of the optical system located in front of said pentagonal prism.

The above metioned and other features and objects of this invention will become apparent by reference to the following description taken in conjunction with the accompanying drawings in which:

DESCRIPTION OF THE DRAWINGS

FIGS. 1, 2 and 3 represent the different optical systems of a laser telemeter;

DESCRIPTION OF THE PREFERRED EMBODIMENT

Figure 4:
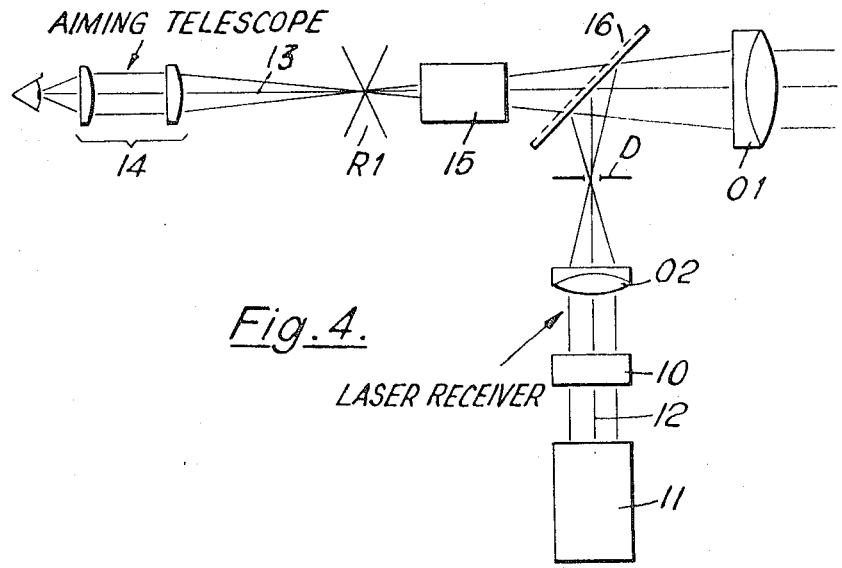
FIG. 4 represents the reception optical system and the optical system of the aiming telescope which have a common part.

Before describing the apparatus object of the present invention, there will first be described the optical systems of a laser telemeter for the adjustment of which the apparatus is particularly intended. Thus, FIGS. 1, 2, 3 represents respectively the emission, reception and aiming optical systems of a laser telemeter. The emitter 1 (FIG. 1) of the telemeter has been represented diagrammatically in the form of an active rod 2, of a rotating prism 3 and of a slightly transparent mirror 4. The light beam 5 emitted by the emitter 1 crosses an optical system 6 the aim of which is to obtain a light beam of very low divergence.

FIG. 2 represents the reception device comprising an optical system 8, a filter 10 and a photoelectric receiver 11.

The filter 10 allows the passage of only the light rays corresponding to the wavelength of the laser emission. The optical system 8 comprises a diaphragm D arranged between two lenses O1 and O2, and its aim is to obtain a field of view of very low divergence. In spite of the very low divergence of the emission and reception fields of view the emission and reception cones present a common part starting from a certain range from the telemeter, said common part enabling the collecting of the light beam reflected by the target. It will be observed that an optimal operation is obtained when the field lighted by the light beam emitted is equal to the field observed by means of the reception optical system. In order that this equality exists, it is necessary that the aperture angles of the emission and reception beams should be the same and that the optical axes 7 and 12 (FIGS. 1 and 2) of the two optical systems should be exactly parallel. Since the aperture angle or divergence angle of the emission beam is generally of one milliradian, the parallelism of the optical axes must be obtained to within a tenth of the divergence of the beams if a loss of ten percent is tolerated in the case of cross fields, viz. about twenty seconds of arc.

FIG. 3 represents the aiming telescope associated with the laser telemeter, said telescope being intended for detecting the reflecting object, the range of which is to be measured. The elements of this telescope are a lens O3, an image rectifier system 15, cross-wires R1 and an ocular 14. The aiming axis 13 is defined by the cross-wires R1 and the middle of the lens O3. The accuracy required for the aiming depends obviously upon the dimension of the reflecting object, the range of which is measured, but obviously it must not limit the performances of the telemeter. It is thus necessary for the telescope to have a limit of resolution at most equal to twenty seconds of arc, and for its aiming axis to be parallel to the emission and reception axes with the accuracy defined hereabove.

The three optical devices of the laser telemeter have been represented separately, but it often happens that such is not the case. Thus, for instance, the lens O1 (FIG. 2) may be common to the reception device and to the aiming telescope, the separation of the beams being obtained further on by a semi-transparent mirror 16 as shown in FIG. 4. In FIG. 4, the elements identical to those of FIGS. 2 and 3 bear the same reference.

In order that the combined optical device of FIG. 4 may be adjusted, it is necessary for the images of the optical axes 12 and 13 across the lens O1 to be superposed. This adjustment is obtained by means of an observation telescope 17 (FIG. 5) arranged in front of the common lens O1, the telescope enabling the observation of the images R'1 of the cross-wires R1 and D' of the diaphragm D. The adjustment is correct when the images R'1 and D' are superposed and the cross-wires R1, for instance, is moved for obtaining this superposition.

Figure 6:
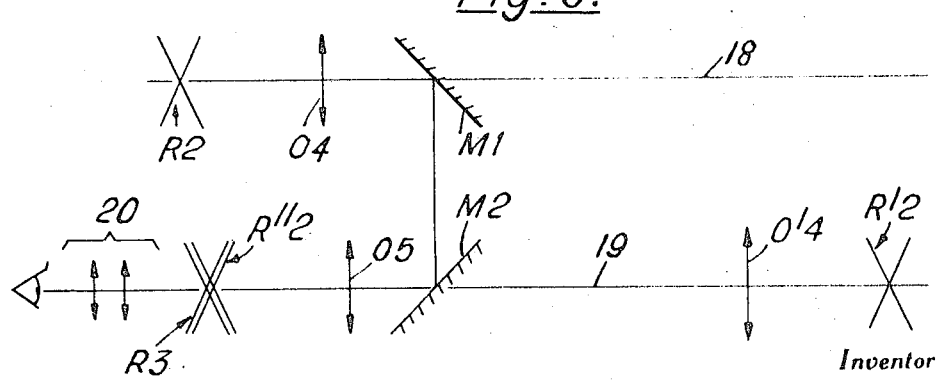
FIG. 6 enables the understanding of the alignment process of two parallel axes far away from each other.

FIG. 6 represents the principle diagram of an optical assembly enabling the adjustment of the parallelism of two optical axes 18 and 19. The optical axis 18 is defined by the cross-wires R2 and the lens O4 and the optical axis 19 is defined by the cross-wires R3 and the lens O5. Owing to the spacing which separates the two optical axes 18 and 19, it is not possible for the input lens of a telescope to receive the light beams coming from the two optical systems. It is thus proposed to refold one of the beams, and to bring it in front of the other; to this effect, one uses two reflecting mirrors M1 and M2, arranged respectively over the optical axes 18 and 19 and at corss angle (right angle) one with respect to the other. These mirrors are generally arranged as shown on FIG. 6, i.e. inclined by 45° with respect to the optical axes 18 and 19 assumed to be parallel. The images of the cross-wires R2 and of the lens O4 through the mirrors M1 and M2 are respectively R'2 and O'4. The two optical axes 18 and 19 will be aligned when the image R'2 of the cross-wires R2 given by the lens O5 will be superposed with the cross-wires R3. The cross-wires R3 and the image R"2 are observed through an ocular 20 and the cross-wires R2 may be moved in order to obtain the superposition of R3 and R"2.

In order that the adjustment may be carried out with the required accuracy, several conditions must be fulfilled. Thus, the various cross-wires must be arranged in the focal planes of the lenses with which they are associated, so that their images may be well localized. Furthermore the axis defined by R2 and O4 and the axis defined by R'2 and O'4 must be parallel with an accuracy at least equal to that required. Now, if each one of the two mirrors M1 and M2 rotates by an angle α with respect to its ideal position, the directions defined by R2, O4 on the one hand, and R'2 and O'4 on the other hand, will rotate by an angle 4α and therefore the mirrors must be positioned within five seconds of arc if an accuracy of twenty seconds of arc is required. Such a setting accuracy of the morrors is very difficult to obtain; furthermore, if this accuracy is obtained during a very short time, it cannot be maintained indefinitely owing to the mechanical distortions due for instance to the temperature variations.

According to the present invention, the mirrors M1 and M2 are replaced by two pentagonal prisms, each pentagonal prism carrying out a rotation by 90° of the incident beam.

Figure 7:
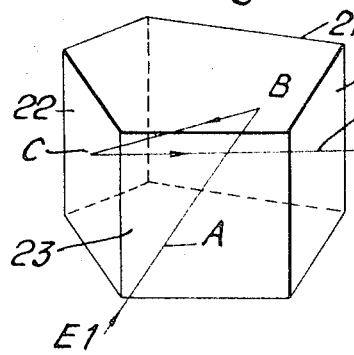
FIGS. 7 and 8 represent a pentagonal prism reducible to two reflections.

FIG. 7 represents a pentagonal prism known as a two-reflection pentagonal prism, since the image of one point may be determined by using a set of two plane reflections; it is also said that the pentagonal prism is equivalent or is reducible to two reflections. In the case of the pentagonal prism of FIG. 7, the reflection planes are constituted by the faces 21 and 22 which make an angle $\beta = 45°$ between themselves as shown on FIG. 8 which represents a cross section of the pentagonal prism of FIG. 7, by an incidence plane at cross angle (right angle) with the intersection axis of said faces. On FIGS. 7 and 8, one may follow the path of an incident ray E1 which strikes at cross angle in A the face 23 of the pentagonal prism, reflects first in B on the face 21, then reflects afterwards in C on the face 22 and comes out from the point E on the face 24, this face 24 being at cross angle with the input face 23. Since the angle $\beta$ of the faces 21 and 22 is equal to 45°, the output ray S1 makes an angle of 90° with the incident ray E1. The accuracy with which this right angle is obtained depends upon the accuracy with which the faces 21, 22, 23 and 24 are cut out. In the cutting and grinding operations, one may obtain for each face an accuracy within one second of arc and it is understood that this accuracy is kept with time.

Figure 8:
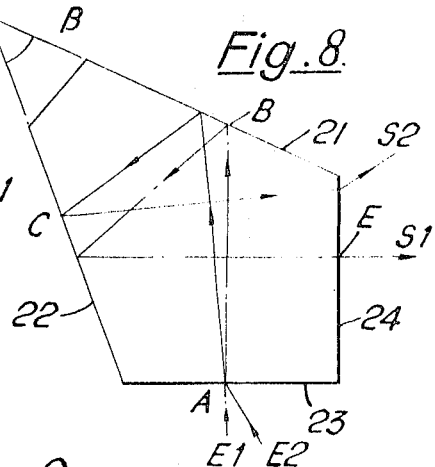
Figure 9:
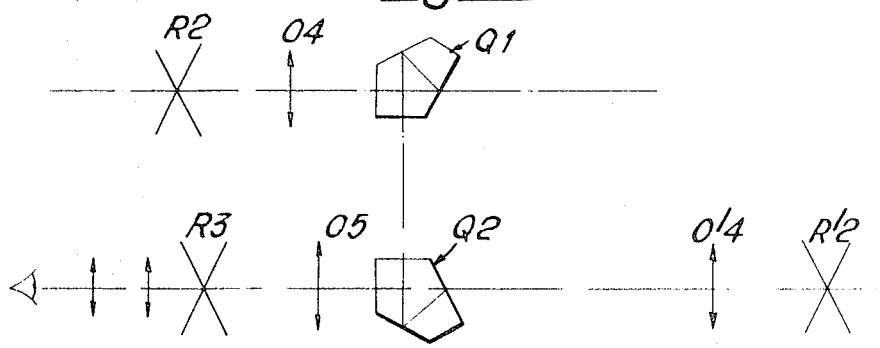
FIG. 9 represents FIG. 6 in which the mirrors have been replaced by two pentagonal prisms.

FIG. 8 shows an interesting property of this pentagonal prism, said property consisting in the fact that incident rays such as E2 which are not at cross angle with the face 23 give rise to output rays such as S2 which make a right angle with the corresponding incident ray. This is equivalent to saying that the perpendicularity of the incident and output rays is kept when the pentagonal prism rotates around the intersection line of the faces 21 and 22. Thus, if two pentagonal prisms with two reflections Q1, Q2 are arranged instead of the mirrors M1 and M2 (FIG. 6) as shown in FIG. 9, the axis (O'4, R'2) remains parallel to the axis (O4, R2) even if the axis (O4, R2) changes its orientation in the plane of the figure, and the pentagonal prisms are rotated around the axes of intersection of the faces 21 and 22. However, when the axis (O4, R2) is shifted by a certain angle in a plane perpendicular to FIG. 9, the axis (O'4, R'2) is no longer parallel to the axis (O4, R2). In effect the output ray is submitted in the output plane perpendicular to the incident plane on the input face to a rotation and to a translation. Thus, if the incident ray makes a site angle +c with respect to the plane perpendicular to the faces 21 and 22 of the pentagonal prism (FIG. 7) the corresponding output ray makes a site angle −c with respect to this plane. This output ray of the first pentagonal prism Q1 (FIG. 9) strikes on the input face of the second pentagonal prism Q2 with a site angle +c and gives rise at the output of this second pentagonal prism Q2 to a ray making a site angle −c. this shows that it is not parallel to the incident ray on the input face of the first pentagonal prism Q1.

Figure 10:
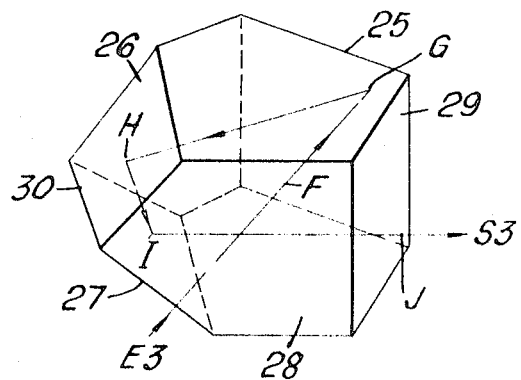
FIG. 10 represents a pentagonal prism reducible to three reflections.

According to the present invention this drawback is suppressed by replacing any one of the two pentagonal prisms by a pentagonal prism known as a three-reflection pentagonal prism. FIG. 10 represents a three-reflection pentagonal prism, viz. a reflection on the face 25, a reflection on the face 26 and a reflection on the face 27. Thus, an incident ray E3 which penetrates the pentagonal prism at the point F of the face 28 carries out the path F G H I J, and comes out as a ray S3 at the point J of the face 29. With respect to the two-reflection pentagonal prism of FIG. 7, the reflection on the face 22 has been replaced by two reflections on the faces 26 and 27 which make between themselves a dihedral angle of 90°, the intersection line 30 of the two faces 26 and 27 making an angle of 45° with respect to the face 25. According to the kinematic theory of the images, these three reflections carry out a rotation of the incident ray as in the case of a pentagonal prism with two reflections, plus a symmetry with respect to a plane containing the edge 30 and perpendicular to the face 25. Thus, if the incident ray makes a site angle +c with respect to the plane defined previously, owing to this symmetry the output ray makes also a site angle +c. It is thus understood that, by combining a two-reflection pentagonal prism with a three-reflection pentagonal prism, the incident ray and the output ray of the system are parallel. It will be observed that the parallelism defect would always exist if two three-reflection pentagonal prisms were used.

Figure 11:
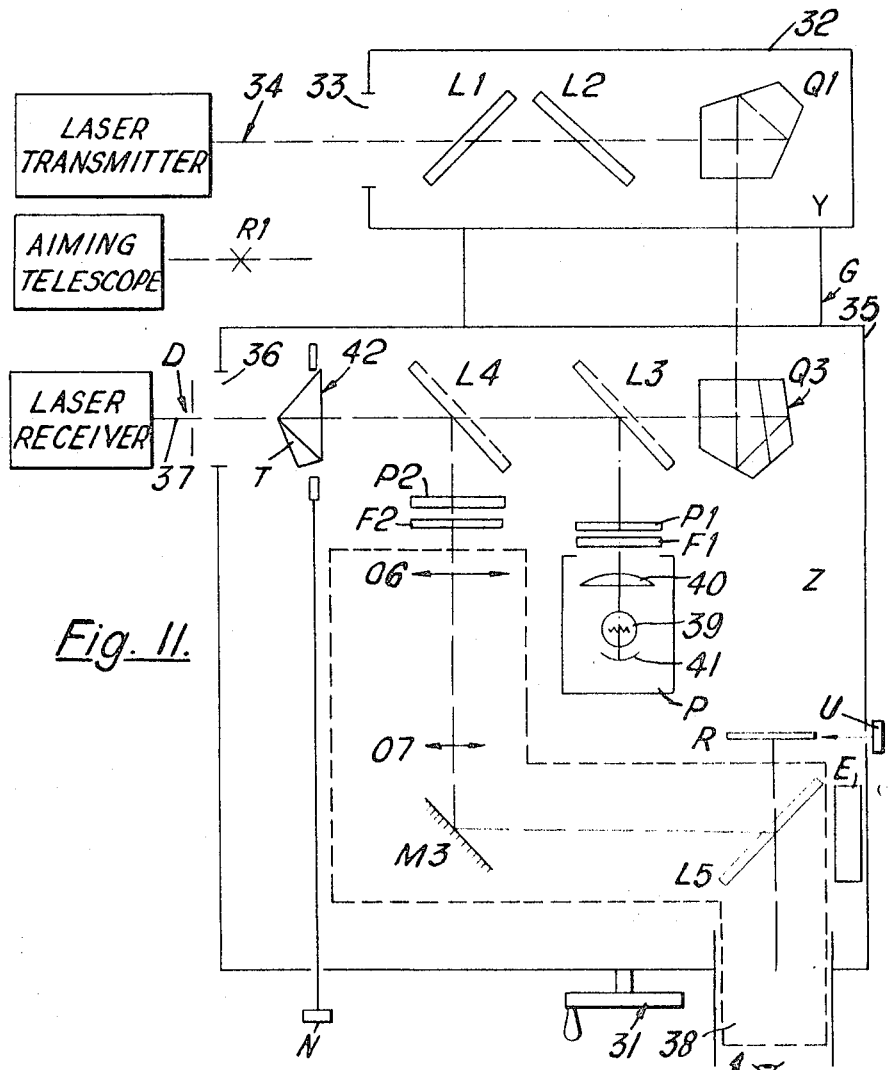
FIG. 11 represents apparatus for adjusting the parallelism of several optical axes.

FIG. 11 represents the diagram of an apparatus enabling the carrying out of the adjustment of the three optical axes of a laser telemeter. This apparatus is constituted by two parts Y and Z, the spacing of which may be modified by moving, for instance, the part Y with respect to the part Z, which remains fixed. This displacement is obtained for instance by means of a slide G linked to the part Z and actuated by a handwheel 31. The part Y comprises a two-reflection pentagonal prism Q1, and two parallel faces plates L1 and L2. These parallel faces plates L1 and L2 are coated with dielectric layers on one face and are thus only slightly transparent, so that the assembly of two plates constitutes an attenuator which allows the transmission of, for instance, only ten percent of the energy of the light beam. These plates L1 and L2 can be used only for a light beam having a certain wavelength, and it is thus necessary to replace them by other plates for a light beam having a different wavelength. These different elements of this part Y are arranged in an enclosure 32 presenting an aperture 33 in front of which will be placed the emission optical device, the optical axis of which is represented by the line 34.

The part Z comprises mainly a three-reflection pentagonal prism indicated generally as Q3, two semi-transparent mirrors L3 and L4, an angular light reflector T which may be concealed or moved by means of a control N, a projector P, the light beam of which is reflected by the semi-transparent mirror L3, and an optical observation device of the images reflected by the semi-transparent mirror L4. This optical observation device comprises two lenses O6 and O7, a mirror M3, a semi-transparent mirror L5, a screen E, and cross-wires R. All these elements are contained in an enclosure 35 presenting two apertures, one being 36 in front of which is located the optical reception device, the optical axis of which is represented by the line 37, and the other 38 which enables the simultaneous observation of the screen E and the cross-wires through the semi-transparent mirror L5. The cross-wires R may be moved in a plane perpendicular to the plane of FIG. 11 into two axes by means of a control U; this cross-wires R is illuminated through a device which is not shown on FIG. 11. The screen E is for example an electroluminescent plate of a type such as described in U.S. Patent No. 2,837,661, entitled Radiation Amplifier and issued to R. K. Orthuber et al June 3, 1958. The projector P is constituted by a filament lamp 39 located both at the focal point of a lens 40 and at the curvature center of a spherical mirror 41. The output beam of cylindrical shape crosses through a filter F1 and a polarizer P1, the purpose of these elements being to limit the spectrum of the beam (F1) and to adjust the intensity of said beam (P1). The filter F2 and the polarizer P2 associated with the lens O6 have the same purpose with respect to the light beam which crosses them, as do the elements P1 and F1 with respect to the lamp beam P. In the adjustment operation which will be subsequently described, the filters and polarizers provide for the improved appearance of certain images.

Figure 5:
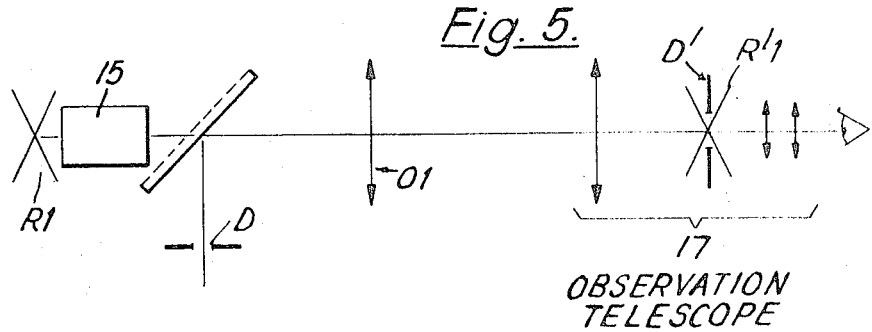
FIG. 5 enables the understanding of the alignment process of two optical axes having a common point.

The lens O6 forms in its focal plane an image of an object at infinity; this image is taken up by the lens O7, then by the mirror M3 and appears on the screen E. As will be shown in the explanation of the mode of operation, the lenses O6 and O7 form the observation telescope represented in FIGS. 5, 6 and 9. In FIGS. 4, 5 and 11, the reflecting face of the semi-transparent mirrors has been represented by a full line, whereas the other face has been represented by a dotted line.

Figure 12:
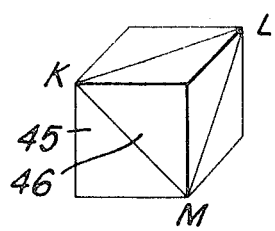
FIG. 12 represents the way according to which an angular light reflector is obtained.

The angular light reflector T is a reflecting trihedral which has the property of reflecting an incident ray in such a way as the reflecting ray is parallel to the incident ray, the angle of incidence being any angle whatsoever. The accuracy of this parallelism depends upon the accuracy of the angles of the angular light reflector, and it is clear that the total accuracy must be at least that which has to be obtained for the adjustment of the optical axes, i.e. twenty seconds of arc. FIG. 12 shows how an angular light reflector is obtained from a glass cube 45; the hatched part 46 represents the angular light reflector. The face K L M represent the input face 42 of the angular light reflector T of FIG. 11, and it is this face which is perpendicular to the axis 37 of FIG. 11.

The operation of the apparatus with regard to the adjustment of the parallelism of the optical axes of the emission and reception devices will now be described, the reception device having a common point with the aiming telescope. The angular light reflector T being concealed by means of the control N, and the projector P being illuminated, the objective of the reception optical system is placed in front of the aperture 36 and its orientation is modified in order to make the image of the diaphragm D (FIG. 2) or the image of the cross-wires R1 (FIG. 3) of the aiming telescope appear on the screen E. In order to make the second image appear with sufficient contrast, one adjusts the polarizers P1 and P2 and a combination of filters F1 and F2 is chosen. By construction, the diaphragm D and the cross-wires R1 are located with sufficient accuracy so that they are in the field of view of the observation telescope constituted by the lenses O6 and O7 (FIG. 11). If such is not the case, the non-visible element will be moved so that it is in the field of view.

The projector P is cut off, the angular light reflector T is set in place, the electroluminescent screen E is energized and the part Y is moved by means of the handwheel 31 in order to place the aperture 33 in front of the transmission object glass. The light pulse transmitted by the telemeter impresses a spot on the screen E and the cross-wires R, previously illuminated, is moved by means of the control U in order to center it on the spot of the screen E, the supply of the screen being afterwards cut-off.

The angular light reflector T being removed, or hidden, and the projector P being illuminated, the diaphragm D (FIG. 2) is moved in order to make its image coincide with that of the cross-wires R. The cross-wires R1 (FIG. 3) is then moved in order to make its image also coincide with that of the cross-wires R. Following these adjustments, the images of the diaphragm D and of the cross-wires R1 are superposed with the cross-wires R which is itself superposed with the luminous spot due to the light pulse which has crossed the transmission optical system, and thereby the three optical axes are aligned.

When the laser telemeter has three separated objectives, the mode of operation consists for example of setting first the parallelism of the transmission and reception optical axes, in the way described previously, by moving the diaphragm D. Following this first adjustment the cross-wires R indicates the position of the image of the diaphragm D and of the luminous spot due to the pulse. The reception objective is kept in front of the aperture 36 and the part Y is put in front of the objective of the aiming telescope, the cross-wires R1 (FIG. 3) of which is illuminated by a projector located in front of the ocular of said telescope. The attenuator, constituted by the plates L1 and L2, is removed and the angular light reflector T closes the aperture 36. The image of the cross-wires R1 appears on the screen E and the cross-wires R1 is moved in order that its image may be centered on the cross-wires R. The three optical axes are then parallel.

When a laser telemeter presents only one single output objective used at the same time for the three optical systems, this objective is located in front of the aperture 36 of the part Z. The first operation consists in locating this objective in front of the aperture in order that the diaphragm D and the cross-wires R1 may have their images on the screen E. To this effect, the projector P is turned on and illuminates the diaphragm D and the cross-wires R1. The plates L1 and L2 of the attenuator are inserted in order to record the impact of the beam on the screen E, said impact being that on which the cross-wires R is centered. The plates L1 and L2 are removed afterwards and the adjustments of the diaphragm D and of the cross-wires R1 are carried out in order that their images coincide with the cross-wires R.

The same method of adjustment may also be used when two of the optical axes, for instance the emission and reception axes, are sufficiently close to each other so that the plate L4 may receive rays coming from the two objectives at the same time.

For the adjustment of the alignment of the optical axes of a laser telemeter emitting a beam at a different wavelength, it is necessary to use another set of attenuating plates L1 and L2, as well as another set of filters and polarizers.

The apparatus of FIG. 11 and its mode of operation have been described in its application to the adjustment of the parallelism of the optical axes of a laser telemeter. This apparatus may be also used for the adjustment of the parallelism of the optical axes of other optical systems, such as binoculars. In these cases, it may then be necessary to make provision for an additional projector with which to illuminate the cross-wires of the optical system located in front of the aperture 33 of part Y.

I Claim:

1. Apparatus for adjusting parallelism between two or more optical axes comprising:
   a two-reflection pentagonal prism having two input faces;
   a three-reflection pentagonal prism having two input faces and positioned so that one of its input faces is parallel to, and spaced from, one of the input faces of a two-reflection pentagonal prism;
   means defining said optical axes, each defining means being placed in front of the input face of one of the prisms which is not opposing the input face of the other prism; and
   means for viewing one of said defining means through both said prisms and for comparing the position of said one defining means with that of another of said defining means to determine the alignment of their respective axes.

2. Apparatus for adjusting parallelism between two or more optical axes, according to claim 1, comprising means for moving one of the two pentagonal prisms in a direction perpendicular to the opposing input faces of the two prisms.

3. Apparatus for adjusting parallelism between two or more optical axes, according to claim 1, wherein said viewing means includes an electroluminescent screen for receiving light transmitted along one of said axes to illuminate a spot thereon for a period of time; and
   means for viewing said electroluminescent screen.

4. Apparatus for adjusting parallelism between two or more optical axes, according to claim 3, further including a movable reference axis defining means adapted to be moved into alignment with said spot.

5. Apparatus for adjusting parallelism between two or more optical axes, according to calim 1, wherein said defining means are cross-wires.

6. Apparatus for adjusting parallelism between two or more optical axes, according to claim 5, wherein the means for viewing said cross-wires comprises:
   a movalbe trihedral light reflector disposed along one of said optical axes common with the three-reflection pentagonal prism for reflecting a first light beam transmitted from another of said optical axes;
   a telescope for transmitting light to said electroluminescent screen;
   a first semi-transparent mirror disposed between said movable trihedral light reflector and said three-reflection pentagonal prism for bending, toward said telescope, said first light beam transmitted from said trihedral light reflector when said reflector is in position, and a second light beam from said one optical axis when said reflector is moved; and
   a second semi-transparent mirror for the simultaneous viewing of said electroluminescent screen and said cross-wires.